United States Patent
Ronnow

(10) Patent No.: US 8,077,541 B2
(45) Date of Patent: Dec. 13, 2011

(54) TESTING A SENSOR TO PRODUCE A FILTER FOR NOISE ATTENUATION

(75) Inventor: Daniel Ronnow, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 545 days.

(21) Appl. No.: 12/169,059

(22) Filed: Jul. 8, 2008

(65) Prior Publication Data

US 2009/0103394 A1    Apr. 23, 2009

Related U.S. Application Data

(60) Provisional application No. 60/981,142, filed on Oct. 19, 2007.

(51) Int. Cl.
*H04B 17/00* (2006.01)
*G01V 13/00* (2006.01)
(52) U.S. Cl. .......................... 367/13; 73/1.85
(58) Field of Classification Search ............ 367/13, 367/43–46; 73/1.82, 1.85
See application file for complete search history.

(56) References Cited

U.S. PATENT DOCUMENTS

| | | | | |
|---|---|---|---|---|
| 3,942,150 A | * | 3/1976 | Booth et al. ................. | 367/13 |
| 4,003,018 A | * | 1/1977 | McCormick ................. | 73/1.85 |
| 4,296,483 A | * | 10/1981 | Haill ........................... | 367/13 |
| 4,750,156 A | | 6/1988 | Abrams et al. | |
| 4,757,706 A | * | 7/1988 | Doggett ....................... | 73/1.85 |
| 4,837,723 A | * | 6/1989 | Peacock ...................... | 367/46 |
| 5,121,362 A | | 6/1992 | Bednar | |
| 5,163,028 A | | 11/1992 | Barr et al. | |
| 5,235,554 A | | 8/1993 | Barr et al. | |
| 5,448,531 A | * | 9/1995 | Dragoset, Jr. ................. | 367/45 |
| 2006/0042352 A1 | | 3/2006 | Kamata | |

FOREIGN PATENT DOCUMENTS

| | | |
|---|---|---|
| CA | 2291333 A1 | 5/2001 |
| GB | 2428798 A | 2/2007 |
| GB | 2434869 A | 8/2007 |
| WO | 2006021877 A | 3/2006 |

OTHER PUBLICATIONS

Badger, Digital Seismic Recorder Specification Standard, Geophysics, 1988, pp. 415-416, vol. 53, No. 03.
MacArthur, Geophone Frequency Calibration and Laser Verification, Geophysics, 1985, pp. 49-55, vol. 50, No. 1.
Rodgers, et al., Signal Coil Calibration of Electromagnetic Seismometers, Bulletin of the Seismological Society of America, 1995, pp. 845-850, vol. 85.
Van Kann, et al, Simple Method for Absolute Calibration of Geophone, Seismometers, and other inertial Vibration Sensors, Review of Scientific Instruments, American Institute of Physics, 2005, vol. 76.
International Search Report, dated Dec. 5, 2008, for PCT/US2008/072869.

* cited by examiner

*Primary Examiner* — Ian Lobo
(74) *Attorney, Agent, or Firm* — Dan C. Hu; Kevin B. McGoff; Kevin P. McEnaney

(57) ABSTRACT

To test a seismic sensor, an output of the seismic sensor in response to a test signal applied by a signal generator is measured. According to a first function that corresponds to a reference response of the seismic sensor and according to a second function that corresponds to a signal containing noise in an environment of the seismic sensor, a filter is created to perform attenuation of the noise. The filter is applied to attenuate noise during testing of the seismic sensor.

23 Claims, 6 Drawing Sheets

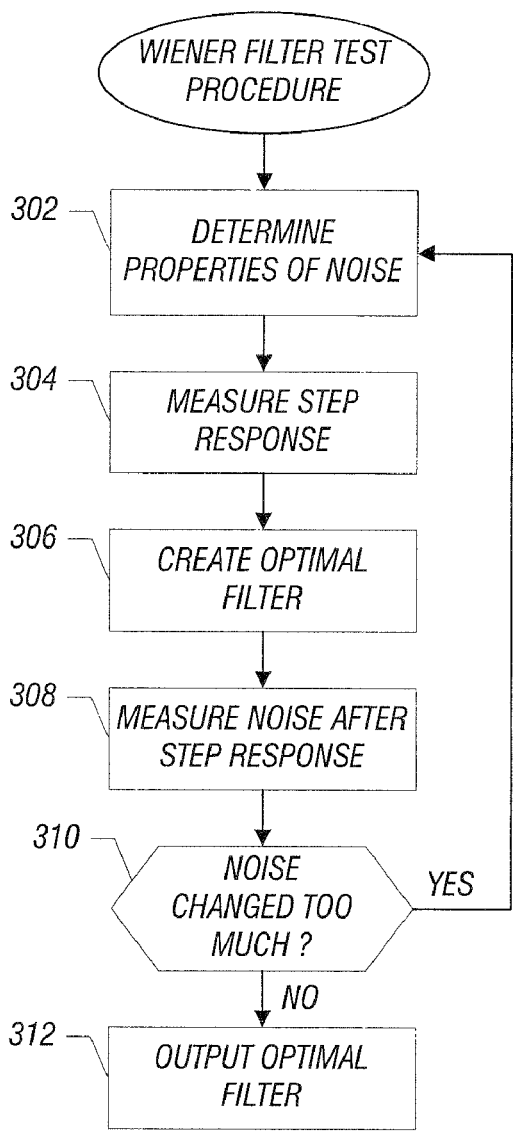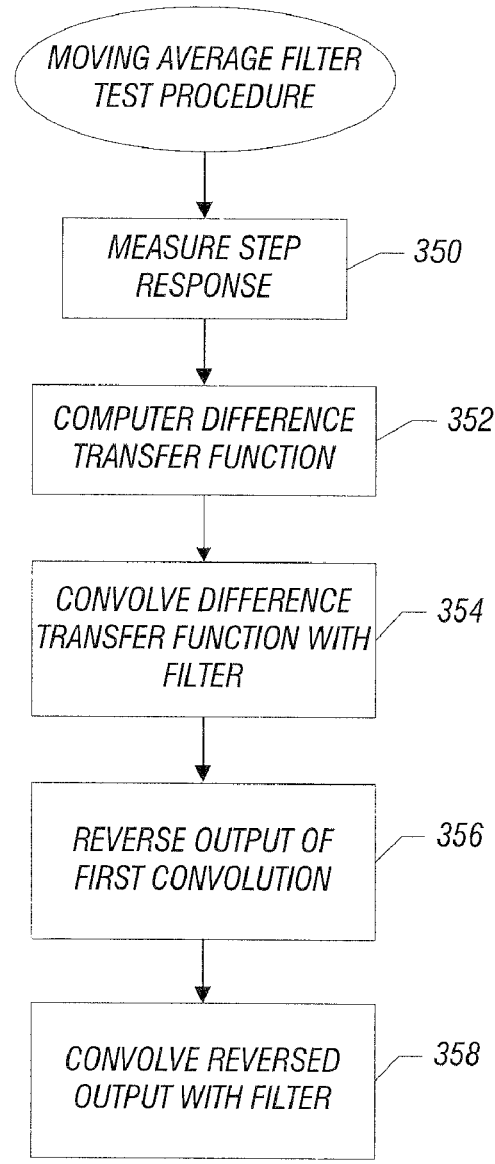
FIG. 3A          FIG. 3B

TESTING A SENSOR TO PRODUCE A FILTER FOR NOISE ATTENUATION

CROSS-REFERENCE TO RELATED APPLICATIONS

This application claims the earlier effective filing date of co-pending Provisional U.S. patent application Ser. No. 60/981,142, filed on 19 Oct., 2007, having the same title "TESTING A SENSOR TO PRODUCE A FILTER FOR NOISE ATTENUATION," by the same inventor.

TECHNICAL FIELD

The invention relates to testing a sensor to produce a filter for noise attenuation.

BACKGROUND

Seismic surveying is used for identifying subterranean elements, such as hydrocarbon reservoirs, fresh water aquifers, gas injection reservoirs, and so forth. In performing seismic surveying, seismic sources are placed at various locations on an earth surface, sea floor or at a sea surface (or in a wellbore), with the seismic sources activated to generate seismic waves directed into a subterranean structure. Examples of seismic sources include explosives, air guns, or other sources that generate seismic waves.

The seismic waves generated by a seismic source travel into the subterranean structure, with a portion of the seismic waves reflected back to the surface (earth surface, sea floor, sea surface, or wellbore surface) for receipt by seismic sensors (e.g., geophones). These seismic sensors produce signals that represent detected seismic waves. Signals from the seismic sensors are processed to yield information about the content and characteristic of the subterranean structure.

To characterize the seismic sensors to assure proper operation, the seismic sensors are tested in situ (in the field) and during production of the seismic sensors. An issue associated with testing seismic sensors is the presence of seismic noise. Seismic noise can be caused by wind, by equipment in the field, or by other factors. The presence of seismic noise can result in longer test times or in preventing tests from being performed at all. Also, reliability of test results can be adversely affected by the presence of noise. For example, if the test result is to be used for calibration of the seismic sensors, the calibration parameters produced from the test results would be less accurate, which can increase errors in seismic data produced from measurements by the mis-calibrated sensors.

SUMMARY

In general, according to an embodiment, to test a seismic sensor, an output of the seismic sensor in response to a test signal applied by a signal generator is measured. According to a first function that corresponds to a reference response of the seismic sensor and according to a second function that corresponds to a signal containing noise in an environment of the seismic sensor, a filter is created to perform attenuation of the noise. The filter is applied to attenuate noise during testing of the seismic sensor.

Other or alternative features will become apparent from the following description, from the drawings, and from the claims.

BRIEF DESCRIPTION OF THE DRAWINGS

FIGS. 3A and 3B are flow diagrams of test procedures in a noisy environment according to some embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

A testing technique according to some embodiments is used to perform tests of seismic sensors used in seismic surveys. In one example embodiment, the sensors include geophones, which can be geophone accelerometers or geophone velocimeters. Other types of seismic sensors can be used in other implementations. The testing technique is effectively used in a noisy environment, such as in a field test (in situ test) of seismic sensors. Note that the testing technique according to some embodiments can also be used in production testing in a noisy environment.

Seismic noise is reduced during testing by using a digital filter, such as Wiener filter or a moving average filter. The digital filter according to some embodiments is an "optimal" filter in the sense that the filter reduces noise while maintaining a response (e.g., a step response) as unchanged as possible. A "step response" of a seismic sensor refers to an output of the seismic sensor in response to an applied input step voltage at the input of the seismic sensor. The step response, with the seismic noise filtered out, can be used for determining a characteristic associated with the seismic sensor, such as a transfer function of the seismic sensor, a non-linear property of the seismic sensor, a polarity of the sensor, and so forth, with enhanced accuracy. Also, if the seismic sensor is a geophone, geophone parameters such as natural frequency, damping, and so forth, can be more accurately determined.

Figure 1:
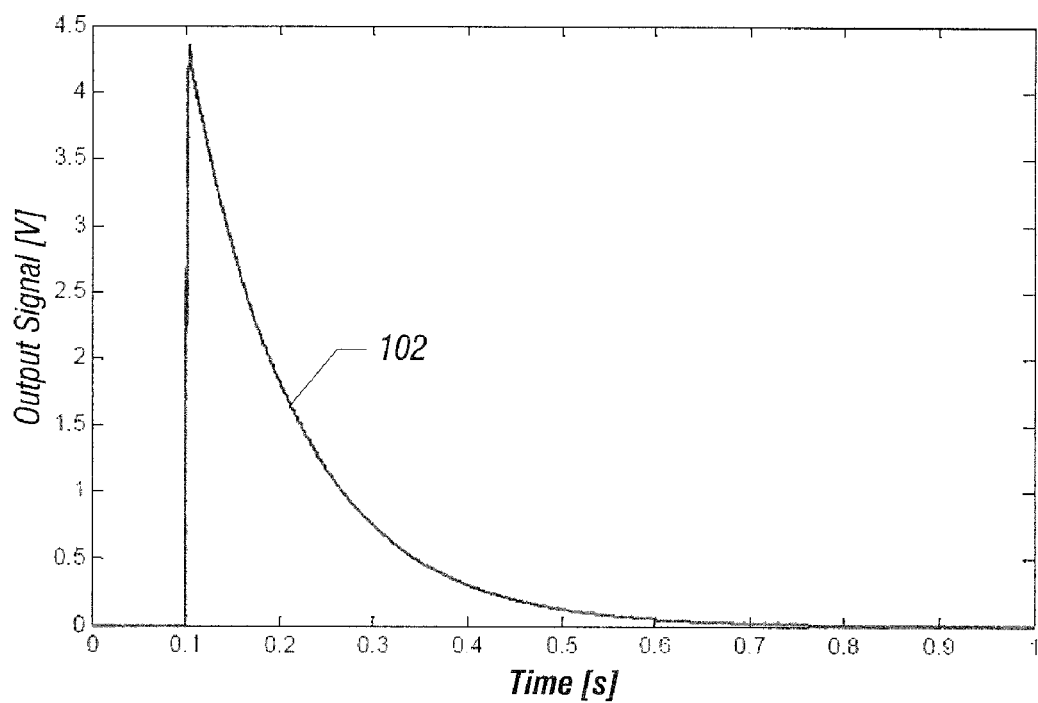
FIG. 1 is a graph of an ideal response of a seismic sensor that is in response to an applied input voltage step.

FIG. 1 shows a step response of a seismic sensor in response to an input step voltage. The step response is represented by a curve 102, which represents an output signal of the seismic sensor as a function of time. The curve 102 represents a noise-free (ideal) step response. The step response depicted in FIG. 1 is the step response of an example geophone accelerometer.

Figure 2A:
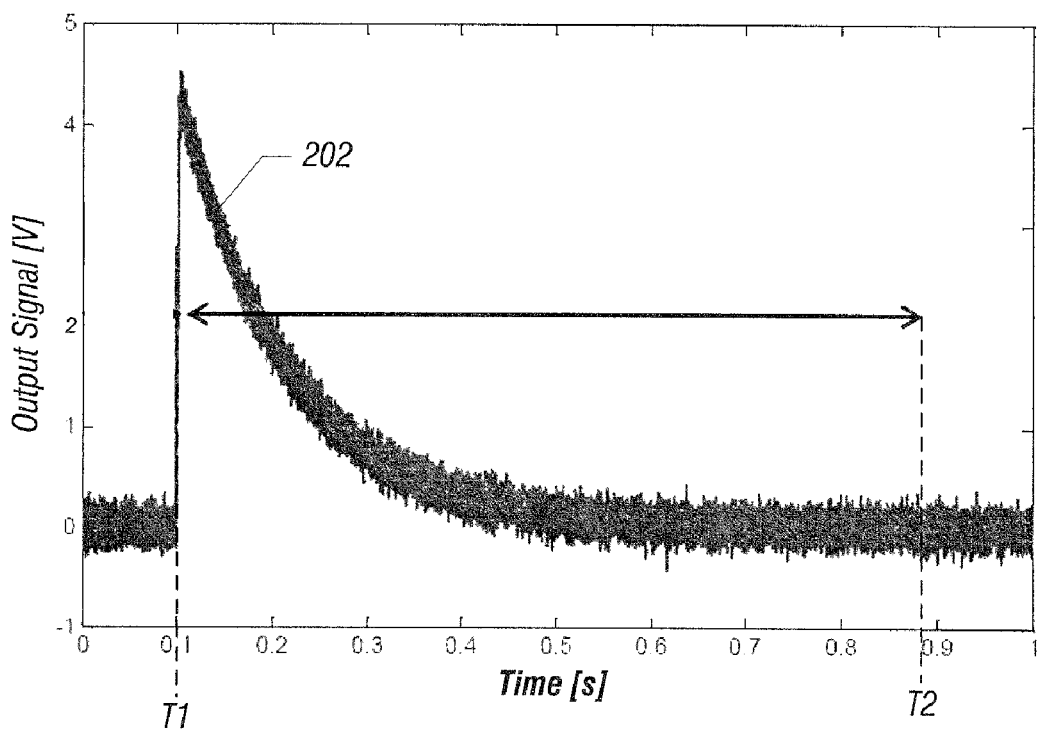
FIG. 2A is a graph of an output signal of a geophone accelerometer that has been subjected to an input voltage step when seismic noise is present in an environment of the geophone.
Figure 2B:
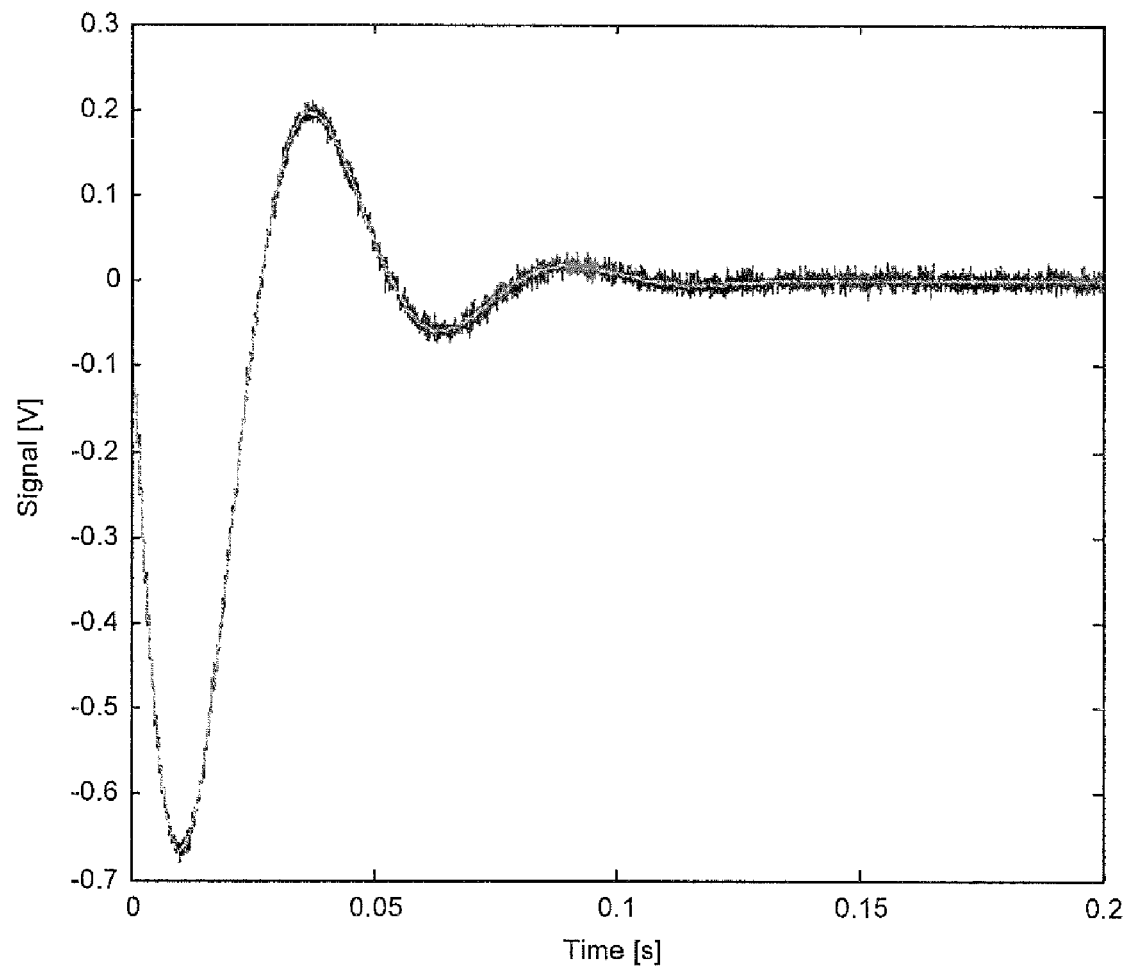
FIG. 2B is a graph of an output signal of a geophone velocimeter that has been subjected to an input voltage step when seismic noise is present in an environment of the geophone.

FIG. 2A shows the step response of a geophone accelerometer in a noisy environment. Note that the step response, represented by curve 202, exhibits variations caused by noise. The step response of a geophone velocimeter would be different. An example of a step response for a geophone velocimeter (in a noisy environment) is depicted in FIG. 2B.

FIG. 3A illustrates the general tasks performed by a test procedure (that uses a Wiener filter to filter noise) according to an embodiment for effective testing of a seismic sensor in a noisy environment. Initially, the statistical properties of the noise that a seismic sensor is subjected to are determined (at 302). An example statistical noise property is standard deviation (root-mean-square value) of the noise. The standard deviation of the noise can be used together with the nominal test response to calculate the signal-to-noise ratio. Other statistical measures include variance, peak-to-average value, or higher order moments (curtosis, skewness) of noise. The determination of the statistical properties of the noise is based on measuring the noise, which occurs before the step test is performed. As depicted in FIG. 2A, the step test is initiated at time T1. Thus, measuring the noise is performed prior to time T1.

In one implementation, an autocorrelation function of the noise is determined, where the autocorrelation function describes the correlation between the noise signal and a time-shifted version of the noise signal, to enable the identification of statistical properties of the noise. Note that the statistical noise properties are useful for producing a digital filter, e.g., a Wiener filter, which is able to filter out noise while maintaining a step response of a seismic sensor unchanged.

Next, at time T1 (FIG. 2A), a step input is applied, which causes a step response to be produced. The step response is measured (at 304). The step response includes the desired step response (ideal step response) in combination with the noise. Effectively, the step response is a sum of the noise signal and the desired step response.

It is noted that the autocorrelation function of the step response is known to a good approximation. Such autocorrelation function can be determined during production of the seismic sensor. Also, it is assumed that the changes of the autocorrelation function with temperature and aging are small.

Next, an optimal filter is created (at 306), where in one example implementation, the optimal filter is a Wiener filter. It is assumed that the noise and the step response are uncorrelated. A Wiener filters out noise based on the statistical approach. The Wiener filter can be an IIR (infinite impulse response) Wiener filter or a FIR (finite impulse response) filter. Also, the Wiener filter can be a causal filter (which is a filter that depends only on past and present inputs) or alternatively, a non-causal filter (which also depends on future inputs).

After the step response (and after creating the optimal filter), at time T2 in FIG. 2, noise can be measured again (at 308), to check (at 310) whether the statistical noise properties have changed too much (by greater than one or more predefined thresholds). If the statistical noise properties have changed by greater than the one or more predefined thresholds, then the procedure according to 302-308 are repeated. Note that in repeating the procedure 302-308, the average of the measured noise can be used in the repeated procedure.

If the statistical noise properties have not changed by greater than the one or more thresholds, then the optimal filter is output (at 312), with the optimal filter applied by the seismic sensor in filtering the step response of the seismic sensor during a test procedure, such as a test procedure in the field or during production testing.

The step response (with noise filtered out) of the test procedure can then be used for determining various characteristics of the seismic sensor, such as its transfer function, its polarity, non-linear parameters, and seismic sensor parameters. Also, other parameters of the seismic sensor can be obtained from the filtered step response, such as sensitivity, natural frequency, and damping.

An example FIR Wiener filter is described in detail below. It is assumed that $d(n)$ represents a discrete time signal for the ideal step response, $v(n)$ represents the discrete time noise signal, and $x(n)=d(n)+v(n)$ is the noisy step response signal, where n represents time points.

In one example, signals $d(n)$ and $x(n)$ are assumed to be jointly wide sense stationary (WSS) with autocorrelations $r_d(k)$ and $r_x(k)$, respectively, and cross correlation $r_{dx}(k)$, where k represents various frequencies. The correctly identified Wiener filter has filter coefficients $w(k)$ that minimize the MSE (mean square error):

$$\xi = E[|e(n)|^2] = E[|d(n) - \hat{d}(n)|^2], \qquad (Eq. 1)$$

where $\hat{d}$ is the filtered signal and E the expected value. The filter coefficients are determined through the Wiener-Hopf equations, which compactly can be written as:

$$R_x w = r_{dx} \qquad (Eq. 2)$$

where $R_x$ is a p×p Hermitian Toeplitz matrix of autocorrelations, and w is the vector of filter coefficients. When $v(n)$ and $d(n)$ are uncorrelated, the correlation sequences become:

$$r_x(k) = r_d(k) + r_v(k), \qquad (Eq. 3)$$

$$r_{dx}(k) = r_d(k), \qquad (Eq. 4)$$

where $r_v(k)$ is the autocorrelation function for the noise signal $v(n)$. Inserting Eqs. 3 and 4 into Eq. 2, the Wiener-Hopf equations become:

$$[R_d + R_v] w = r_d, \qquad (Eq. 5)$$

where $R_d$ is the autocorrelation matrix (corresponding to the autocorrelation function) for $d(n)$, and $R_v$ the autocorrelation matrix (corresponding to the autocorrelation function) for $v(n)$. Note that as discussed above, $R_d$, $R_v$, and $r_d$ are known, so that w, which contains the filter coefficients, can be derived to define the Wiener filter.

Other types of Wiener filters, such as IIR Wiener filters, square root IIR filters, etc., can also be readily computed.

Alternatively, instead of using a Wiener filter as the optimal filter, another type of filter can be used, such as a moving average filter, which is described as follows. Basically, the moving average filter is a low-pass filter that filters out high-frequency noise.

The frequency-domain transfer function of a seismic sensor is represented according to the following formula:

$$H(f) = \frac{Y_{step}(f)}{A_{ref}(f)}, \qquad (Eq. 6)$$

where $H(f)$ is the transfer function, $Y_{step}(f)$ is the step response, and $A_{ref}(f)$ is the reference input signal, with units [V/g], [V], and [g], respectively, in one example.

As an alternative to filtering the step response $Y_{step}$ directly, the transfer function $H(f)$ can be filtered instead. The basic idea of this filtering of the transfer function is to look at a difference signal:

$$|\Delta H(f)| = |\Delta H_x(f)| - |\Delta H_{ref}(f)|, \qquad (Eq. 7)$$

where $H_x(f)$ is the transfer function with noise and $H_{ref}(f)$ is the reference transfer function at room temperature (no noise or reduced noise). $H_x(f)$ is determined based on the measured step response $Y_{step}(f)$. One reason for using the difference transfer function $\Delta H(f)$ instead of the transfer function directly is that the edges of the transfer function will be difficult to filter if the filter would be applied directly. Thus, the goal is to keep the difference signal as small as possible with as low frequency content as possible.

Also, the phase difference can be filtered:

$$\angle \Delta H(f) = \angle H_x(f) - \angle H_{ref}(f). \qquad (Eq. 8)$$

Alternatively, the difference of the step response (test signal) can be filtered in similar fashion:

$$|\Delta Y(f)| = |\Delta Y_{step}(f)| - |\Delta Y_{ref}(f)|, \quad \text{(Eq. 9)}$$

$$\angle \Delta Y(f) = \angle Y_{step}(f) - \angle Y_{ref}(f), \quad \text{(Eq. 10)}$$

To apply a moving average filter on the difference transfer function, a forward and reversed digital filter is applied, by using a function filtfilt( ):

$$y = \text{filtfilt}(b, a, x),$$

where y is the filtered sequence (same length as x), b and a are the filter coefficients, and x is the input sequence to be filtered (in this case $\Delta H(f)$). In one example, a=1 and b is a vector with repeating elements with value $1/l_b$ and length $l_b$, where $l_b$ is the filter order.

The moving average filtering algorithm first convolves an input sequence x with the vector b, where the input sequence is the amplitude or phase of the difference transfer function, i.e., $|\Delta H(f)|$ or $\angle \Delta H(f)$, or the amplitude or phase of the difference test signal, $|\Delta Y(f)|$ or $\angle \Delta Y(f)$. The filter is expressed in Eqs. 11-13 below:

$$y_{temp}[n] = \sum_{m=1}^{l_b} b[m]x[n-m], \, l_b \text{ is the length of vector } b. \quad \text{(Eq. 11)}$$

The resulting vector $y_{temp}$ is then reversed and convolved with b again:

$$y_{rev}[n] = y_{temp}[l_y - n + 1], \, l_y \text{ is the length of vector } y_{temp}. \quad \text{(Eq. 12)}$$

The resulting filtered output (with noise attenuated) is:

$$y[n] = \sum_{m=1}^{l_b} b[m] y_{rev}[n-m]. \quad \text{(Eq. 13)}$$

This output is longer than the original sequence that was used as input; this means that the resulting sequence y is modified to fit the length.

The above provides an example of applying a moving average filter, where the filter b[m] is applied first on a forward sequence (input x[ ]), and again on a reverse of the sequence ($y_{rev}$[ ]).

When using the moving average filter, the test procedure is modified from the procedure of FIG. 3A. The moving average filter test procedure is depicted in FIG. 3B. The step response of the seismic sensor is measured (at 350). Next, the difference transfer function $\Delta H(f)$ based on the difference between $H_x(f)$ (determined from the step response) and a known reference transfer function $H_{ref}(f)$ is computed (at 352). $\Delta H(f)$ is used as the input sequence that is first convolved (at 354) with the filter b[m] in a first direction (according to Eq. 11 above). Then, the output of the convolution, $y_{temp}[n]$ in Eq. 12, is reversed (at 356) to produce $y_{rev}[n]$, which is then convolved (at 358) with the filter b[m] to produce a filtered output y[n].

By using a filter (e.g., Wiener filter or moving average filter) according to some embodiments to remove noise, more accurate characterization of a seismic sensor can be performed, either during a field test or a production test.

In some embodiments, the input test signal (e.g., input voltage step) applied to the seismic sensor can be provided by a local signal generator, which may be integrated with the seismic sensor in some implementations. Alternatively, the test signal can be generated by a signal generator that is remotely located from the seismic sensor.

Figure 4:
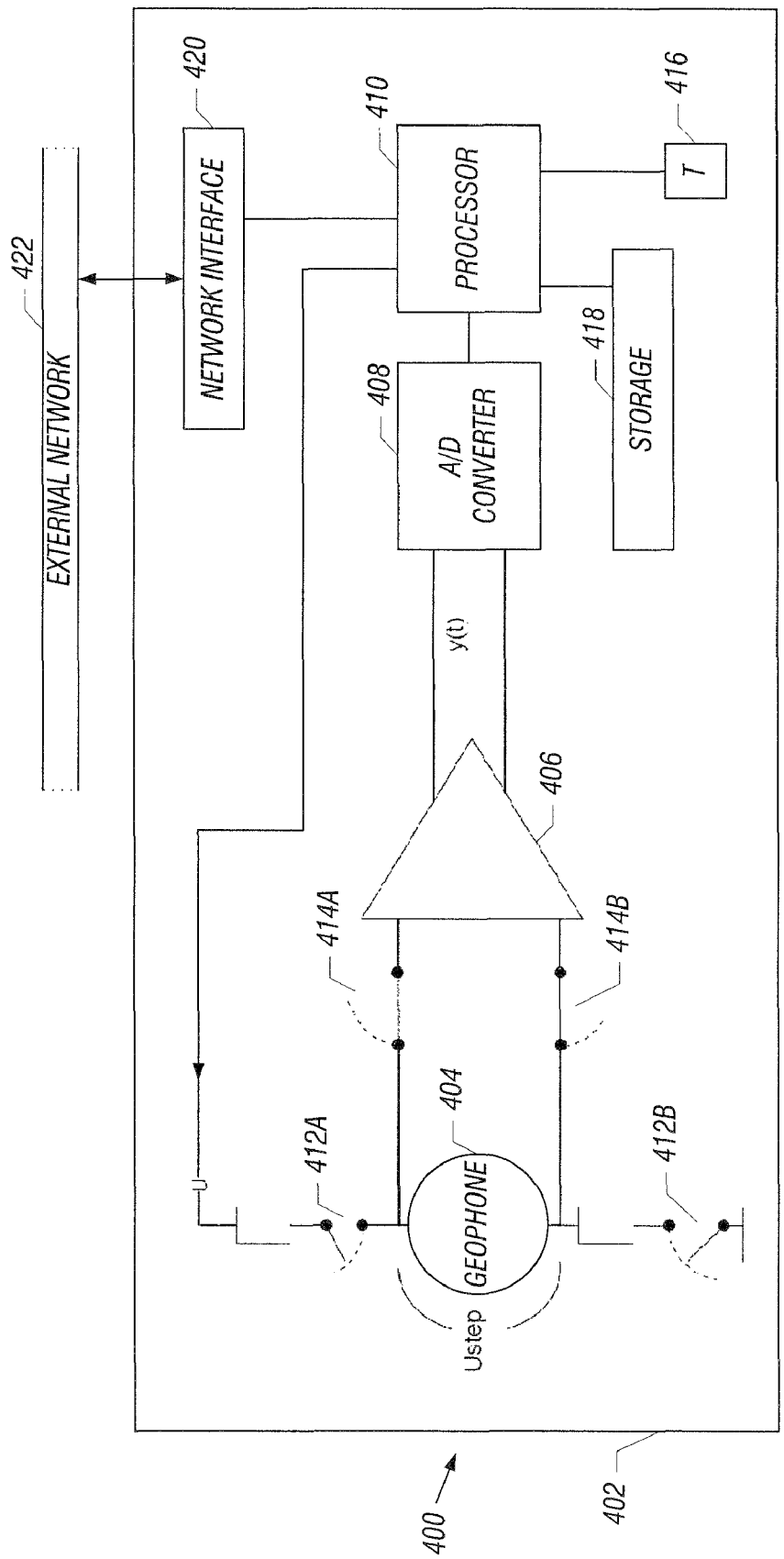
FIG. 4 is a block diagram of a self-contained seismic sensor according to an embodiment.

An example of a seismic sensor with integrated local signal generator is depicted in FIG. 4. FIG. 4 shows an example embodiment of a self-contained seismic sensor 400, which has an external housing 402 that contains various components. The components contained in the housing 402 of the seismic sensor 400 include a seismic sensing element 404, such as a moving coil geophone, accelerator geophone, or other type of seismic sensing element. In response to a step input (input test signal), represented as Ustep, which is generated during a testing procedure of the seismic sensor 400, the geophone 404 produces an output that is amplified by an amplifier 406. The amplifier 406 produces an output signal representing the step response, y(t), that is responsive to the step input Ustep.

The output signal representing y(t) is provided to the input of an analog-to-digital (A/D) converter 408, which converts the analog output signal representing y(t) to digital data. The digital step response is then processed by a processor 410. The processor 410 can be implemented with a digital signal processor (DSP), a general purpose microprocessor, or any other type of processing element.

The step input Ustep is generated based on an applied input voltage U, provided by the processor 410 directly or indirectly (through other circuitry). The processor 410 also controls geophone test switches 412A and 412B, where the geophone test switch 412A connects the input voltage U to one side of the seismic sensing element 404, and the other geophone test switch 412B connects the other side of the seismic sensing element 404 to a reference voltage, such as ground. The processor 410 also controls another set of switches 414A, 414B, which connect the output of the geophone 404 to the input of the amplifier 406. The switches 414A, 414B are referred to as amplifier switches.

Note that during normal operation, which is operation of the seismic sensor 400 in the field for performing a seismic survey, the geophone test switches 412A, 412B remain open, whereas the amplifier switches 414A, 414B remain closed. In this "normal" configuration, the seismic sensing element 404 is able to detect a seismic input, such as in the form of an acoustic wave reflected from the subterranean structure, to produce an output representing the received seismic signal that is provided to the amplifier 406.

However, during a test operation for testing the seismic sensor 400, the amplifier switches 414A, 414B are initially open to isolate the output of the seismic sensing element 404 from the input of the amplifier 406. Moreover, the geophone test switches 414A, 414B are also initially open such that no input is applied to the seismic sensing element 404. To apply the input step, Ustep, to the seismic sensing element 404, the geophone test switches 412A, 412B are closed. Note that the time constant of the switches 412A, 412B is much smaller than a time constant of the seismic sensing element 404 (in other words, the response time of the test switches 412A, 412B is much faster than the response time of the seismic sensing element 404). Simultaneously, or almost simultaneously, with the closing of the geophone test switches 412A, 412B (to apply the input step signal Ustep), the amplifier switches 414A, 414B are also closed. Note that the response time of the amplifier switches 414A, 414B is also much faster than the response time of the seismic sensing element 404. Thus, by the time that the seismic sensing element 404 has responded to application of the input step signal Ustep, the amplifier switches 414A, 414B are already closed to allow the output of the seismic sensing element 404 to be provided to the input of the amplifier 406.

To provide fast response times, the switches 412A, 412B and 414A, 414B can be implemented with solid state switches, such as transistors.

The input test voltage U can remain fixed during the entire duration of a test procedure, or alternatively, the input test voltage U can be varied by the processor 410. For example, the processor 410 may be coupled to a temperature sensor 416 in the seismic sensor 400 (or alternatively, to a temperature sensor located externally to the seismic sensor 400) to receive temperature data regarding an environment of the seismic sensor 400. The processor 410 can vary the input test voltage U based on the temperature measurement, since the processor 410 may have to take into account variations in the response of the seismic sensing element 404 due to temperature variation.

From the step response produced by the seismic sensing element 404 as a result of the input test signal, the processor 410 determines a characteristic of the seismic sensor 400. The determined characteristic can include a polarity of the seismic sensing element 404, a temperature-dependent transfer function of the seismic sensing module 400, and/or a characterization of non-linear properties in a signal acquisition chain of the seismic sensor 400 including the seismic sensing element 404, the amplifier 406, the A/D converter 408, and so forth. Note that the step response can be a filtered step response (as filtered by the Wiener filter or moving average filter discussed above) to enable provision of more accurate characterizations of the seismic sensor 400.

Information regarding the determined characteristics can be stored in a storage 418 (e.g., memory, persistent storage, etc.) that is in the seismic sensor 400. Note that the storage 418 can be part of the processor 410. Also, in some cases, the processor 410 is able to communicate information regarding the determined characteristics through a network interface 420 (located inside the seismic sensor 400) to an external network 422.

The network interface 420 in the seismic sensor 400 includes various protocol layers to allow for communication over the external network 422, including a physical layer, data link layer, and higher layers. In one example implementation, the network interface 420 can include Transmission Control Protocol (TCP)/Internet Protocol (IP) layers to allow for communication of control signals and data in TCP/IP packets over the external network 422. In other implementations, the external network 422 can be a simpler network, such as a network that includes a control line and a data line. Also, the external network 422 can be considered to include a power line to provide power to the sensing module 400.

Figure 5:
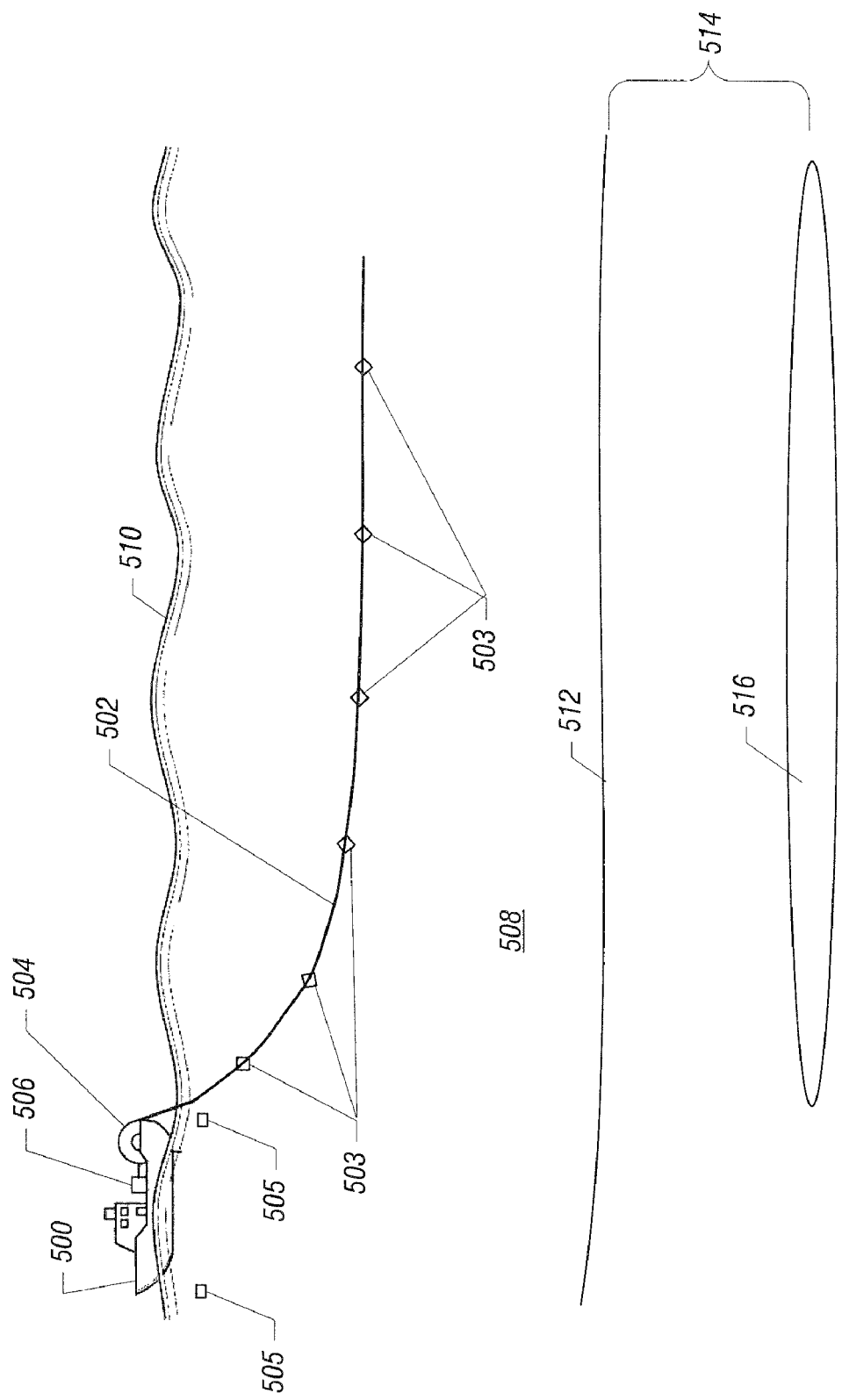
FIG. 5 illustrates an example arrangement of seismic sensors deployed in a marine environment.

An example arrangement to perform marine seismic surveying is depicted in FIG. 5. In different implementations, however, other embodiments can involve seabed seismic surveying, land-based seismic surveying or wellbore seismic surveying. FIG. 5 illustrates a sea vessel 500 that has a reel or spool 504 for deploying a streamer 502 (or multiple streamers 502), where the streamer 502 is a cable-like carrier structure that carries a number of electronic devices 503 for performing a subterranean survey of a subterranean structure 514 below a sea floor 512. In the following, the term "streamer" is intended to cover either a streamer that is towed by a sea vessel or a sea bed cable laid on the sea floor 512.

The electronic devices 503 can include seismic sensors, steering or navigation devices, air gun controllers (or other signal source controllers), positioning devices, and so forth. Also depicted in FIG. 5 are a number of signal sources 505 that produce signals propagated into the body of water 508 and into the subterranean structure 514. Although the sources 505 are depicted as being separate from the streamer 502, the sources 505 can also be part of the streamer 502 in a different implementation.

The signals from the sources 505 are reflected from layers in the subterranean structure 514, including a resistive body 516 that can be any one of a hydrocarbon-containing reservoir, a fresh water aquifer, a gas injection zone, and so forth. Signals reflected from the resistive body 516 are propagated upwardly toward the seismic sensors of the streamer 502 for detection by the seismic sensors. Measurement data is collected by the seismic sensors, which can store the measurement data and/or transmit the measurement data back to a control system (or controller) 506 on the sea vessel 500.

Figure 6:
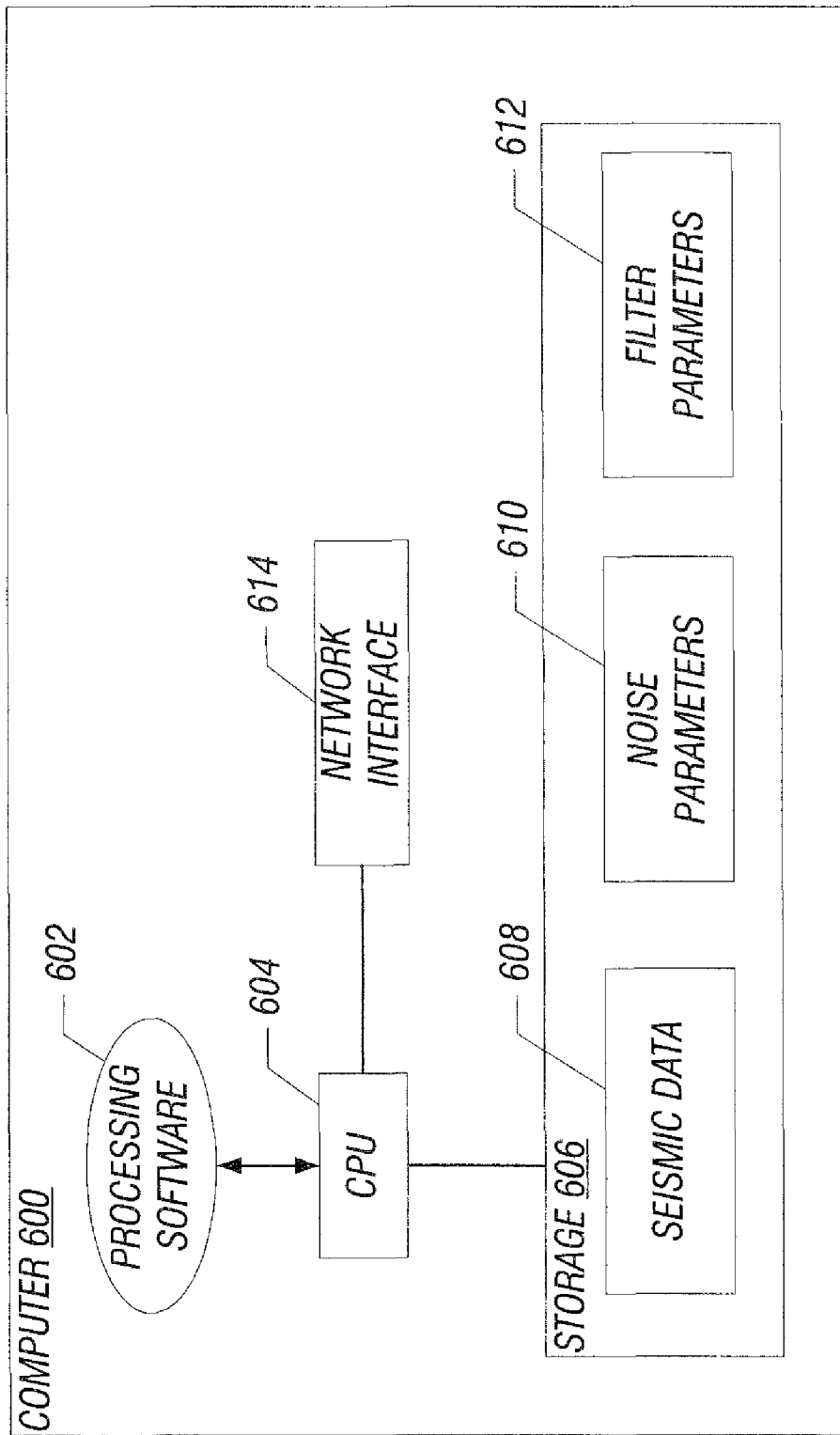
FIG. 6 is a block diagram of an example computer to perform processing according to some embodiments.

FIG. 6 shows an example computer 600, which can be used to implement the control system 506 of FIG. 5, in which processing software 602 according to some embodiments is executable. The processing software 602 can be used to perform at least some of the tasks associated with the testing procedure discussed above, including, for example, creating an optimal filter to remove or reduce noise during testing of a seismic sensor. The processing software 602 is executable on one or more central processing units (CPUs) 604, which is connected to a storage 606. The storage 606 can be used to store various data, including seismic data 608 collected by one or more seismic sensors, noise parameters 610 to characterize noise associated with a seismic sensor, and filter parameters 612 generated by the processing software 602 when creating the optimal filter for removing noise.

The computer 600 also includes a network interface 614 to allow the computer 600 to communicate with an external network element, including seismic sensors and/or a remote computer.

The processing software 602 can be loaded for execution on a processor, such as one or more CPUs 604. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of testing a seismic sensor, comprising:
   measuring an output of the seismic sensor in response to a test signal applied by a signal generator;
   determining a response based on the output of the seismic sensor;
   according to a first function that corresponds to a reference response of the seismic sensor and according to a second function that corresponds to a signal containing noise in an environment of the seismic sensor, creating a filter to perform attenuation of the noise; and
   applying the filter to the response based on the output to attenuate the noise in the output of the seismic sensor during testing of the seismic sensor.

2. The method of claim 1, wherein creating the filter comprises creating a Wiener filter.

3. The method of claim 1, wherein creating the filter comprises creating a moving average filter.

4. The method of claim 1, wherein creating the filter comprises creating the filter that reduces noise while keeping a response of the seismic sensor unchanged.

5. The method of claim 1, wherein the test signal is a step input, and measuring the output of the seismic sensor comprises measuring a step response of the seismic sensor.

6. The method of claim 1, wherein the first function comprises a first autocorrelation function corresponding to the reference response, and wherein the second function comprises a second autocorrelation function corresponding to a noise signal representing the noise.

7. The method of claim 6, further comprising determining the second autocorrelation function to determine properties of the noise prior to applying the test signal to the seismic sensor.

8. The method of claim 7, further comprising:
after creating the filter, checking the noise in the environment of the seismic sensor and determining whether properties of the noise have changed by greater than one or more thresholds from properties of the noise prior to applying the test signal.

9. The method of claim 8, further comprising:
in response to determining that the noise properties have changed by greater than one or more thresholds, repeating the filter creating task.

10. The method of claim 1, wherein the first function comprises a reference transfer function of the seismic sensor in an environment of reduced noise, and the second function comprises a second transfer function of the seismic sensor with noise present.

11. The method of claim 10, further comprising computing a difference transfer function that is based on a difference between the reference and second transfer functions,
wherein the response based on the output comprises the difference transfer function, and wherein applying the filter to attenuate noise during testing of the seismic sensor comprises applying a moving average filter on the difference transfer function.

12. The method of claim 11, wherein applying the moving average filter on the difference transfer function comprises:
convolving the moving average filter with the difference transfer function to produce an output vector;
reversing an order of the output vector to produce a reversed output vector; and
convolving the moving average filter with the reversed output vector to produce a filtered output vector that represents the output of the seismic sensor in response to the test signal with noise attenuated.

13. The method of claim 11, wherein applying the filter to attenuate the noise during testing of the seismic sensor further comprises applying a moving average filter on a phase difference of the first and second transfer functions.

14. The method of claim 1, wherein applying the filter to the response based on the output to attenuate the noise in the output comprises applying the filter on a difference between a magnitude of a step response representing the output and a magnitude representing the reference response, and applying the filter on a difference between a phase of the step response and a phase of the reference response.

15. The method of claim 1, further comprising obtaining at least one parameter based on the output with noise attenuated, the at least one parameter selected from among sensitivity, natural frequency, and damping of the seismic sensor.

16. An article comprising at least one computer-readable storage medium containing instructions that when executed cause a computer to:

measure properties of noise in an environment of a seismic sensor;
measure an output of the seismic sensor in response to a test signal applied by a signal generator;
determine a response based on the output of the seismic sensor;
according to the measured properties of the noise and properties of a reference response of the seismic sensor in an absence of noise, create a filter to perform attenuation of the noise; and
apply the filter to the response based on the output to attenuate noise in the output of the seismic sensor during testing of the seismic sensor.

17. The article of claim 16, wherein measuring the properties of the noise comprises computing an autocorrelation function of the noise prior to applying the test signal to the seismic sensor.

18. The article of claim 17, wherein the properties of the reference response of the seismic sensor is based on a second autocorrelation function of the reference response.

19. The article of claim 16, wherein creating the filter comprises creating a Wiener filter.

20. The article of claim 16, wherein measuring the properties of the noise is performed prior to applying the test signal to the seismic sensor, and wherein the instructions when executed cause the computer to further:
measure properties of the noise in the environment of the seismic sensor after creating the filter;
compare the measured properties of the noise prior to applying the test signal to the measured properties after creating the filter;
determine whether the measured properties of the noise prior to applying the test signal differ by greater than one or more predetermined thresholds from the measured properties after creating the filter; and
in response to determining that the measured properties of the noise prior to applying the test signal to the seismic sensor differ by greater than the one or more predetermined thresholds from the measured properties of the noise after creating the filter, repeat creation of the filter.

21. A computer comprising:
a network interface to receive a measured output of a seismic sensor in response to a test signal applied by a signal generator;
a computer-readable storage medium storing instructions; and
a processor, wherein the instructions are executable by the processor to:
determine a response based on the output of the seismic sensor;
according to a first function that corresponds to a reference response of the seismic sensor and according to a second function that corresponds to a signal containing noise in an environment of the seismic sensor, create a filter to perform attenuation of the noise; and
apply the filter to the response based on the output to attenuate noise in the output of the seismic sensor during testing of the seismic sensor.

22. The computer of claim 21, wherein the filter comprises a Wiener filter.

23. The computer of claim 21, wherein the filter comprises a moving average filter.

* * * * *